Aug. 2, 1960 G. H. BAKER ET AL 2,947,815

TELEGRAPH SIGNAL ERROR COUNTING CIRCUIT

Filed Dec. 18, 1956 2 Sheets-Sheet 1

INVENTORS G. H. BAKER
D. MITCHELL
J. V. REIHING, JR.
BY John E. Cassidy
ATTORNEY Aug. 2, 1960 G. H. BAKER ET AL 2,947,815

TELEGRAPH SIGNAL ERROR COUNTING CIRCUIT

Filed Dec. 18, 1956 2 Sheets-Sheet 2

INVENTORS G.H. BAKER
D. MITCHELL
J.V. REIHING, JR.
BY
John E. Cassidy
ATTORNEY 2,947,815

TELEGRAPH SIGNAL ERROR COUNTING CIRCUIT

George H. Baker, Chatham, and Doren Mitchell, Martinsville, N.J., and John V. Reihing, Jr., Pittsburgh, Pa., assignors to Bell Telephone Laboratories, Incorporated, New York, N.Y., a corporation of New York Filed Dec. 18, 1956, Ser. No. 629,436

8 Claims. (Cl. 178—69)

This invention pertains to a counting circuit for counting errors in received telegraph signals. Particularly, the invention is a new circuit for counting errors in multielement two-condition telegraph signals such as are ordinarily employed in permutation code telegraph or teletypewriter systems.

An object of the invention is to accurately count the errors in received telegraph signals.

A particular object of the invention is to accurately count the errors in received multielement two-condition telegraph signals.

In anticipation of the detailed description to follow, the system of the present invention will first be described generally.

A telegraph signal transmitter is arranged to continuously produce telegraph signals of a first condition and of a second condition alternately for any desired interval. These signals may, for instance, be current-no-current signals in a direct-current telegraph signal circuit connected to a carrier telegraph transmitting circuit which latter transmits alternating-current signals. The carrier signals may be amplitude modulated or frequency modulated by the impressed direct-current signals and responsively may produce carrier current signals as a first signaling condition and no carrier signals as a second signaling condition. Alternatively, the carrier frequency may be switched so that signals of a first frequency are transmitted as a first signaling condition and signals of a second and different frequency transmitted as a second signaling condition.

If the signals as generated in the direct-current telegraph circuit, before modulation of the transmitting carrier, are a continuous succession of alternate square wave current-no-current signals, the received signals after demodulation, if free from errors should correspond. Each square wave marking signal element should be followed by a no-current spacing signal element. Generally, the way in which such a pattern of signals is affected by errors is by the elimination of a current or signal element, during an interval in which there should be a marking signal element, or by the introduction of a current signal element during a spacing signal interval, at which time there should be a no-current signal element. The present circuit, when arranged in a first manner, tests for the presence of errors during the spacing signal intervals by sensing the presence of current signal elements during such interval when, if a signal element is correct, there should be none. When arranged in a second manner, the present circuit tests for the presence of errors during marking signal intervals. It does this by a process of inversion, by first changing the normal marking or current signal elements into spacing or no-current signal elements.

To continue the general description, at the receiver, the incoming signals are applied to two parallel paths. One of these paths passes the raw signals as received including the errors if any. In the other path the signals are first impressed on a narrow band-pass filter which is tuned so that it rings at the frequency of the incoming signals. The output of this filter will be substantially a continuous uninterrupted sine wave at the standard signal frequency, presupposing errors not exceeding a permissible maximum. That is to say, if the errors do not exceed a certain amount, far in excess of any amount ordinarily encountered in usable transmission, the output of the filter will be an unbroken sine wave, notwithstanding the errors. This sine wave will be amplified and clipped to a square wave which therefore corresponds to the original signal wave as generated and is free from errors. The square wave is differentiated to produce a succession of narrow positive and negative pulses. The negative pulses are eliminated. The positive pulses are modified in width and amplitude to afford a succession of relatively narrow current pulses of small amplitude, and delayed in time so that each occurs while the middle of a spacing or no-current signal element in the raw signal train is being received. These serve as test pulses. These test pulses are then combined with the raw signals including the errors, if any, by superimposing the narrow test pusles of small amplitude occurring at the middle of each spacing signal interval on the incoming signal train, including the errors.

When so combined, there will be no change in any received marking signal element, whether it be correctly a current signal element, or incorrectly a no-current signal element, since it will not have any test pulse superimposed thereon as test pulses are applied only to signal element occurring during a spacing signal interval of the incoming signals. Each of the signals received occurring during a normal marking signal interval, whether correct or incorrect, will produce no effect on the error sensing circuit, which will not be affected by marking or current signals of normal amplitude or by their absence. Each spacing signal element in the raw train, if correct, should be of no-current throughout its full duration. Each of these will have a narrow current pulse of small amplitude inserted at its middle portion as a result of the superposition of the test elements. These will be passed by the error sensing circuit without counting, as correct spacing signal elements. Each erroneous spacing or no-current signal element in the raw signal train will be a current signal element. The superposition on each of these at its middle portion of the narrow current test pulse of small amplitude will produce a signal element the amplitude of which at its middle portion, will be greater than that of a normal marking or current signal element. Each such abnormality appearing in the now modified raw signal train will represent an erroneous spacing signal element. It will be sensed and counted by the counter in the present circuit over the testing period while the signal trains are being transmitted.

To count errors in marking signal elements, the received raw train is inverted so that a normal marking or current signal element becomes a normal no-current or spacing signal element and a normal spacing or no-current signal element becomes a normal marking or current signal element. Erroneous marking signal elements which, in the raw state, will be no-current signal elements, will, after inversion, appear as current signal elements. The phasing of the test elements or narrow current pulses of small amplitude, produced in the filter circuit will be modified so that they appear at the middle of a normal marking signal interval of the incoming train. When superimposed on a normal marking signal element after inversion of the marking signal element, there will be produced a no-current signal element having a narrow current pulse of small amplitude in its middle portion. When added to an erroneous marking signal element, after inversion of the erroneous marking signal element, which will then appear as a current signal element, the test pulse will produce a short spur projecting through the top of a current signal element. These will be sensed and counted during the testing period as marking signal errors.

The invention may be understood from the following description taken together with the associated drawings which disclose a preferred embodiment in which the invention is presently incorporated. It is to be understood, however, that the invention may be practiced in other forms which may be suggested to those in the art from a consideration of the following.

Figure 1:
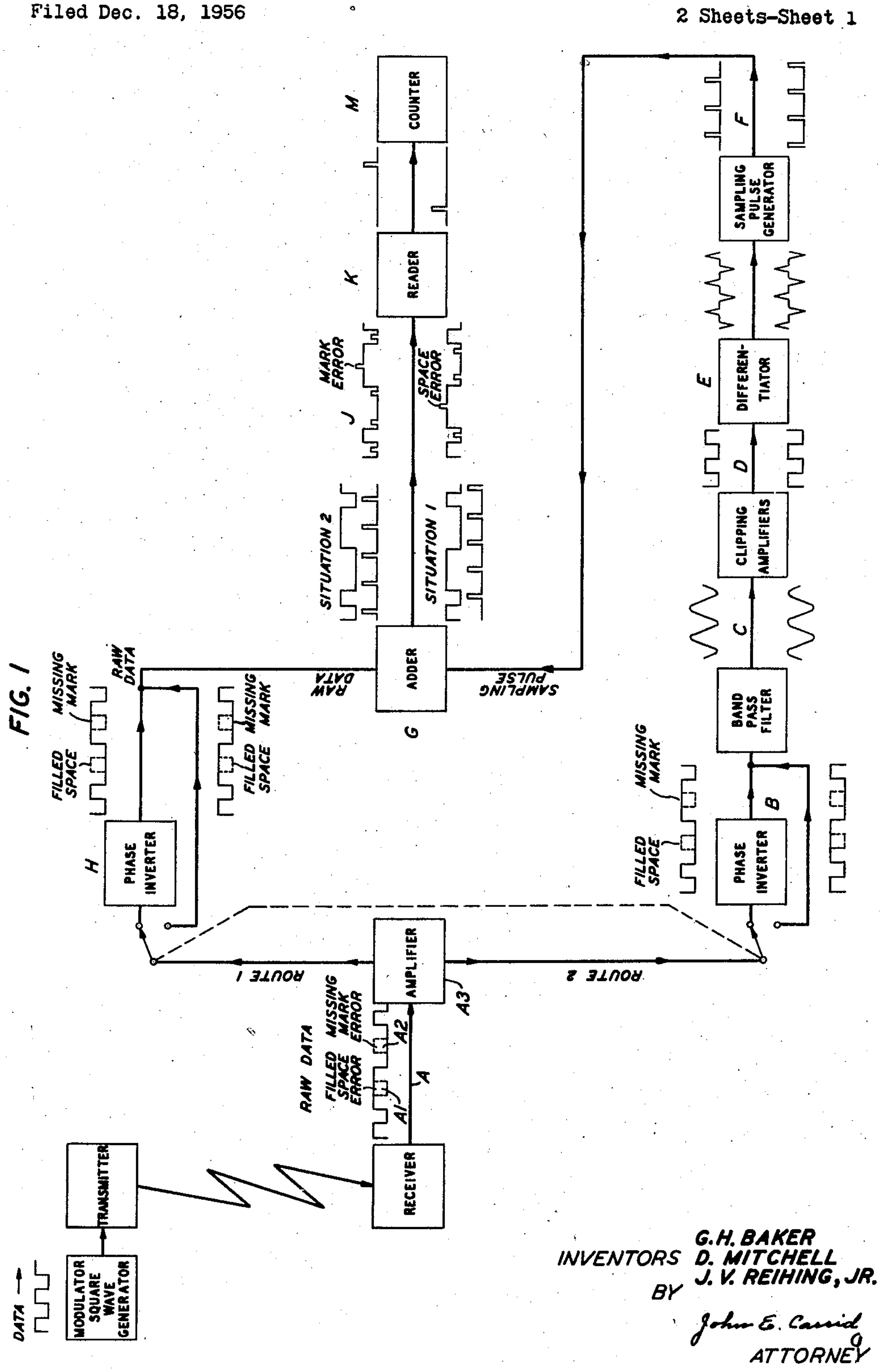
Fig. 1 is a schematic drawing of the circuit of the invention in diagrammatic form in which the major components of the circuit are identified by captioned rectangles.

Refer now to Fig. 1 which shows a diagram of the circuit of the present invention in which the major circuit components are represented by captioned rectangles and in which the wave form of the ouput of each of the components is shown adjacent to the component.

The circuit is adapted to test for spacing errors when arranged in one manner and to test for marking errors when arranged in another manner. When testing for spacing errors the phase inverters at point H and at point B are switched out of circuit. They are switched into circuit when testing for marking errors. The wave configurations when testing for spacing errors are shown below the solid lines interconnecting the elements and the wave configurations when testing for marking errors are shown above the lines. First the operation of the circuit when testing for spacing errors will be explained.

In the arrangement in Fig. 1 a radio telegraph transmitter is assumed to be frequency modulated for the tests by a square wave generator, both shown at the upper left in Fig. 1, sending continuous reversals of marking-spacing signals. The modulator and the transmitter are shown at the upper left in Fig. 1. The problem is to observe the signals at the output of the radio receiver shown at the left middle portion in Fig. 1, to determine the number of two kinds of errors, that is, missing marking or filled spaces, which may be present in the received signals.

Referring to point A in Fig. 1, the two types of errors are shown in the signal wave. The signal train, if free from errors, should be a succession of alternate current and no-current pulses. At point A1 the signal element should be a no-current space signal element. However, the signal element actually received is a current signal element or marking signal element. That is to say, the space has been filled. At point A2 a current or marking signal element is missing. Instead of a current or marking signal element the signal element actually received is a spacing signal element or no-current signal element. It is desirable to count these two kinds of errors separately.

The incoming signals are impressed on an amplifier at point A3 and are directed into two parallel branches.

To determine the presence of an unwanted pulse or the absence of a wanted pulse, the raw signals must be compared with a known reference. The reference pulses are produced in the lower branch. When testing for filled spaces the phase inverter shown at point B is omitted and the signals from amplifier A3 are passed directly into a narrow band-pass filter which rings at the normal frequency of the incoming signal train. Thus occasional errors will have very little effect upon the filter output.

As mentioned in the foregoing, the wave form of the signals when testing for filled spaces is shown below the line in each instance where two sets of waves are indicated at the output of a component.

The sine wave output of the filter is amplified and clipped to a square wave as shown at point D, having no missing marks or filled spaces and which exactly duplicates the square wave signals generated and with which the transmitter is modulated. This signal now becomes the known reference and is the source of the sampling pulses.

It is necessary that the sampling pulses be variable both in time of occurrence and width, relative to the incoming signals, so that only a thin slice from the center of the incoming signals be sampled. This minimizes the chance of sampling noise rather than signal. In order to derive such a variable sampling pulse, the reference square wave at point D is differentiated through a network at point E. The differentiator produces a narrow positive spike of small amplitude on each transition from space to mark and a narrow negative spike of small amplitude on each transition from mark to space. The negative spike or pulse is eliminated by impressing the output of the differentiator on a grounded rectifier, which may preferably be a dry rectifier such as a germanium varistor, for instance. Since the objective is to obtain from the output of the lower or test signal supply branch, a substantially rectangular pulse occurring at the middle of a spacing signal interval, it is necessary to square up the triangular spikes from the output of the differentiator and to delay their occurrence so that they occur at the middle of a spacing signal element of the incoming signal train. This is done by applying the positive going spikes produced by the space to mark transition in the differentiator on a one-shot multivibrator which generates a narrow square wave as shown at point F. By suitable controls in the multivibrator stage and associated circuits, both pulse width and pulse phase can be controlled.

The sampling pulses are now superimposed on the raw signals in the adder network at point G. Observing the pulse relationship at the output of the adder, it is apparent that the sampling pulses fall in the middle of the space time slot so that, should a space be filled erroneously, the addition of the test pulse to the filled space will cause the resultant signal to rise above the normal signal level, as shown at point J designated "space error." These high projections are read in the reader and counted in the counter. It is emphasized that the circuit when arranged as described in the immediate foregoing can detect and count only filled space errors.

The present circuit may count also mark errors by introducing one phase inverter in the raw signal branch to invert the received signals and a second phase inverter in the test signal branch to advance the test signals one full signal interval. The circuit has been operated in one embodiment with a single phase inverter serving both branches. By switching the phase inverter into the circuit at point H the incoming signal train is inverted so that a mark appears as a space and vice versa. In the raw signals a missing mark will appear as a space. After inversion, potentialwise, the missing mark will appear as a mark.

For this condition the test branch is provided with a phase inverter which is switched into the circuit of point B. After inversion the output of the inverter is impressed on the band-pass filter. It will be observed that the phase of the signals in testing for mark errors shown above the line is opposite from that for testing for space errors shown below the line. The inverted sine wave is amplified and clipped and then differentiated. The negative going spikes are eliminated and the positive going spikes are used to trigger the sampling pulse generator. The output is a series of relatively narrow positive pulses advanced in time one signal interval, each of which thus occurs at the middle of a normal mark signal interval of the incoming signal train.

The inverted received signal train including the errors and the sampling pulses are combined in the adder. The relationship of the two trains before addition is shown above the line just to the right of the adder. The combined train is shown to the left of the reader. The addition produces a narrow voltage pulse as indicated in section J, at the point designated "mark error." This is read by the reader and counted by the counter.

Figure 2:
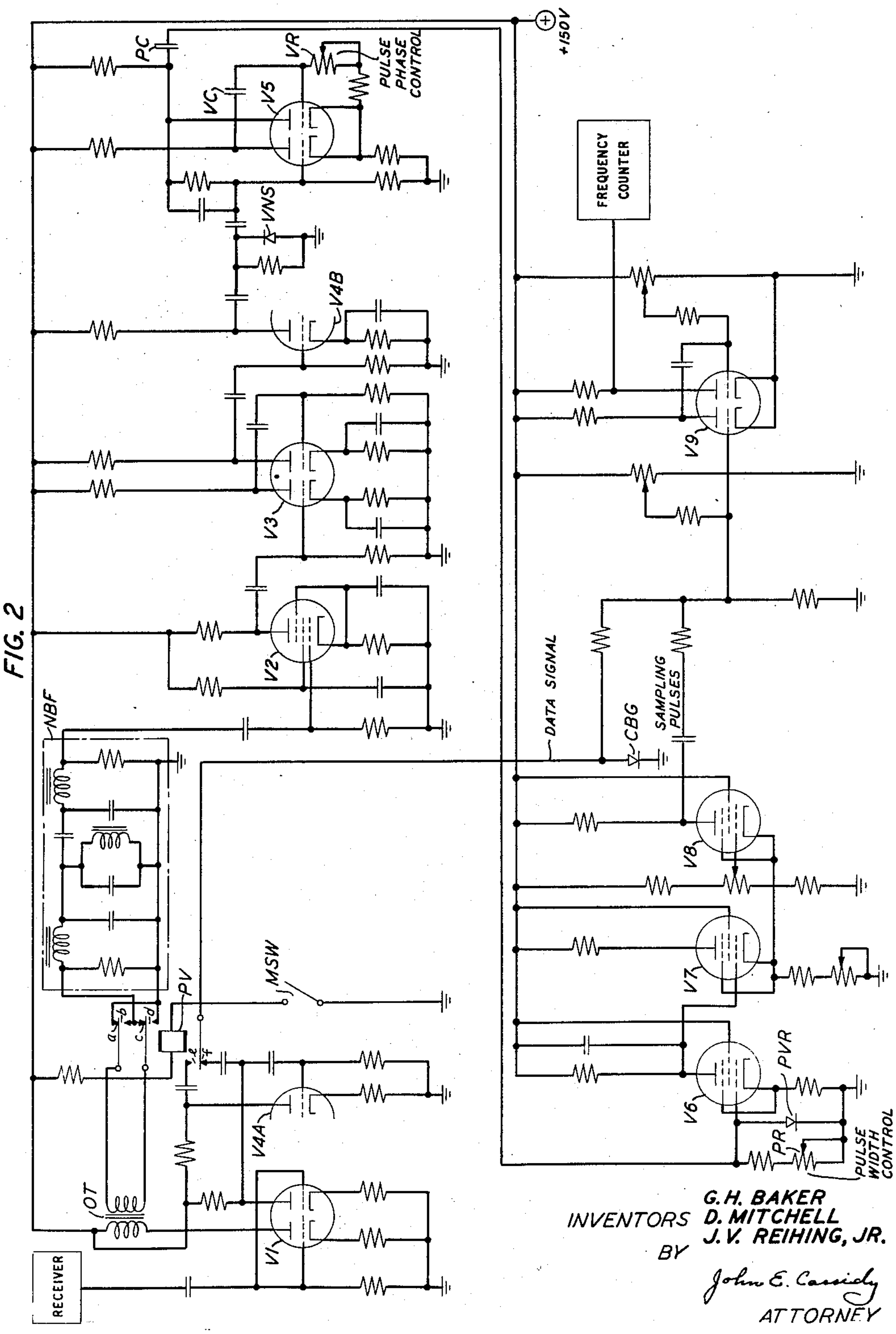
Fig. 2 is a detailed circuit drawing of the invention.

The detailed circuit of the telegraph signal error counter is shown in Fig. 2. The incoming signals after passing through the radio receiver are impressed on the input circuit of each of the twin triodes V1. Each triode serves as an individual amplifier, one, the right-hand triode, for the raw signals and the other, the left-hand triode, for the sample or test pulses.

First to consider the test pulse circuit, the output circuit of the left-hand triode passes from a positive battery source through the primary of output transformer OT, the secondary of which is impressed through contacts *a* and *c* of phase inverter relay PV, when the relay is released as shown, on a narrow band-pass filter NBF, which rings at the normal frequency of the incoming signals. The sine wave output of the filter is repeatedly amplified and clipped through four stages of RC amplification in pentode V2, twin triode V3 and triode V4B, which latter may be one-half of a twin triode. The resulting square wave is then differentiated in the capacitor resistor circuit intermediate the output of triode V4B and the input of the left-hand triode of the one-shot multivibrator V5. Varistor VNS is poled to direct the negative-going spikes, provided by the mark to space transitions of the square signal wave through differentiation, to ground. The positive-going spikes produced by the space-to-mark transitions of the square signal wave through differentiation are impressed on the left-hand triode of twin triode V5 which is connected as a single shot multivibrator. Each positive going potential spike impressed on the input of the left-hand triode of tube V5 triggers the left-hand triode, the output which is connected to the input of the right-hand triode through a capacitor-resistor circuit VC—VR, the magnitude of the resistor VR being adjustable, to adjust the time constant of the circuit. By this means the potential applied to the input of the right-hand triode of tube V5 can be maintained at a level to keep the tube conducting for an interval after the left-hand triode cuts off. As a result the positive-going potential spike applied to the input of the left-hand triode of tube VC is converted into a rectangular widened pulse, the width of which may be adjusted by adjusting the variable resistor. By this means the position in time of the negative-going trailing edge of the rectangular pulse produced by the multivibrator V5 may be displaced, so that it occurs later in the signal time slot than the positive going spike which produced it.

The output of the multivibrator V5 is coupled to the input of pentode V6 through a differentiator circuit comprising capacitor PC and adjustable resistor PR. The positive going potential spikes are shunted to ground through the dry rectifier PVR. The negative going potential spikes are applied to the input of pentode V6 which is biased above cut off and the negative spikes cut off the tube. When pentode V6 is cut off, the positive potential change at its anode applied to the input of pentode V7, which is normally cut off, activates pentode V7. Pentode V7 is arranged as a cathode follower. The increased positive potential of the cathode of pentode V7, when it is activated, increases the potential of the cathode of pentode V8, which is directly coupled to the cathode of pentode V7 so as to maintain proper phase relationship. Pentode V8 is biased to conduct with no signal input. The positive potential rise applied to its cathode cuts off pentode V8. The potential of the anode of pentode V8 increases positively when it is cut off. The result is a large positive pulse in phase with the pulse applied to its cathode. The multivibrator V5 affords a means of adjusting the phase of the output pulse from pentode V8. By changing the slope of the differentiator circuit comprising capacitor PC and adjustable resistor PR it is possible to change the width of the output pulse.

The sampling pulse circuit provides a pulse which may be independently adjusted both in phase and in width, as both of these variables are under control of individually adjustable resistors. The output phase, as explained may be adjusted by adjustable resistor VR and the width may be adjusted by adjustable resistor PR.

To return now to the path of the raw signals, they are amplified in the right-hand triode of twin triode V1. In the present description it has been assumed that phase inversion relay PV is unoperated, as shown. In this position triode V4A is not connected operatively in circuit. The signals from the output of the right-hand triode of tube V1 pass through contact *f* of relay PV. Varistor CBG is poled to shunt positive potential pulses to ground, thus clamping the raw signals below ground.

The raw signals clamped below ground and the sampling pulses are both impressed through a resistor network on the input of the left-hand triode of twin triode V9 which is biased to yield an output pulse only when a sampling pulse potential is superimposed on a filled space, which latter is a spacing error. The signals are amplified in the two stages of double triode V9. A frequency counter, such as a Hewlett Packard Frequency Counter, connected to the output of the right-hand triode of double triode V9 will count the pulses in this output as errors.

When marking errors are to be counted, switch MSW is operated, operating phase inversion relay PV over an obvious circuit. This reverses the connection of the output of the left-hand triode of double triode V1 to filter NBF by changing the connections of the secondary of transformer OT and the filter NBF from contacts *a* and *c* to contacts *b* and *d*, respectively. This inverts the phase of the sample pulses. The opening of contact *f* and closing of contact *e* effectively connects triode V4A in circuit. Triode V4A is a unity ratio amplifier the function of which is to invert the phase of the raw signals. This inversion of both the sample pulses and of the raw signals enables the circuit to count marking errors in a manner which should be understood from the foregoing.

What is claimed is:

1. An error indicator circuit for indicating errors in received standard square wave telegraph test signals, said circuit comprising means responsive to received signals for generating standard sampling signals and means for testing the received signals with said sampling signals.

2. An error indicator circuit for indicating errors in received standard square wave telegraph test signals, said circuit comprising a telegraph signal receiver, a telegraph signal sampling path connected to said receiver, and means in said path, responsive to incoming signals impressed thereon, for reproducing standard signals free from errors as sampling signals.

3. An error indicating circuit for indicating errors in received square wave telegraph test signals, said circuit having a first and a second branch, means for impressing incoming raw signals including errors on said first branch, means for impressing raw signals including errors on said second branch, means in said second branch responsive to said impressing of said raw signals for producing standard sampling signals corresponding to said raw signals but free from errors, means for thereafter combining said branches in a common output path and means in said output path responsive to said combining for indicating errors in said received raw signals.

4. A telegraph signal transmitter comprising a source of telegraph signal marking and spacing signal reversals at a particular frequency connected through a telegraph signal channel to a telegraph receiver, a narrow band-pass filter connected to said receiver, said filter tuned to ring at said frequency, means connected to said filter for producing standard sampling signals corresponding to said reversals, and means for testing signals received through said channel by said receiver, from said source, said means comprising means for combining said received signals and said sampling signals.

5. A telegraph signal testing system comprising a source of marking and spacing telegraph signal continuous reversals at a particular frequency, said source connected through a telegraph transmitter and a telegraph channel to a telegraph receiver, a first and a second output path connected to said receiver, means for impressing raw signals received from said source through said transmitter, said channel and said receiver on both of said paths, a narrow band-pass filter in said first path tuned to ring at the frequency of said reversals, means connected to said filter for reproducing said reversals at said frequency as standard sampling signals, means for modifying said standard sampling signals, said means comprising a differentiator responsive to the transitions of said standard sampling signals, a rectifier for eliminating the differentiated pulse on one transition of said standard sampling signals, means for modifying the differentiated pulse on the other transition of said standard sampling signals, means for joining said paths so as to combine said raw signals in said second path and said modified signals in said first path and means responsive to said combining for indicating the errors in said raw signals.

6. A telegraph signal testing system comprising a generator of mark and space square wave signal reversals at a predetermined frequency, a telegraph signal transmitter connected to said source responsive to said signals, a telegraph signal channel connected to said transmitter, a telegraph signal receiver connected to said channel, a first and a second output path connected to said receiver, a narrow band-pass filter in said first path, said filter sharply tuned to said frequency, so as to ring and to provide a sine wave output at said frequency in response to said square wave signals including errors from said receiver, amplifying and clipping means in said first path responsive to said sine wave signals, so as to produce standard square wave signals corresponding to said generated signals and free from errors, a differentiator in said path responsive to said standard square wave signals, said differentiator producing positive going and negative going signal pips at positive going and negative going transitions of said standard signals, a rectifier in said first path connected to the output of said differentiator for eliminating said pips produced by one of said transitions, means in said first path for modifying the pips responsive to the other of said transitions to change its wave form, width and phase so as to produce a narrow sampling signal pulse at the middle of mark or space signal elements of the original signals, means for combining said narrow sampling pulses in said first path with said raw signals in said second path, and means responsive to said combining for indicating errors in said raw signals.

7. A telegraph error indicating circuit having means therein for indicating errors in standard square wave telegraph test signals, said means comprising a signal receiver, a first and a second raw signal output path from said receiver, means in said first path responsive to incoming raw signals for reproducing standard square wave marking and spacing signals at the same frequency as the signals as generated, means in said first path responsive to said reproduced signals for modifying said reproduced signals so as to selectively produce relatively narrow sample signaling pulses at the middle of a marking or spacing signal interval as generated, means for combining said two paths and means responsive to said combining for selectively superimposing said sample pulses on marking or spacing error signal elements.

8. An error indicator circuit, for indicating errors in received square wave current and no-current signal elements, having means therein for translating erroneous signal elements, both current and no-current, into current signal elements, means for selectively combining therewith a current impulse to produce a current impulse of abnormal amplitude and means for identifying said impulse of abnormal amplitude as an error.

References Cited in the file of this patent

UNITED STATES PATENTS

| | | |
|---|---|---|
| 2,160,083 | Peterson | May 30, 1939 |
| 2,581,961 | Lake | Jan. 8, 1952 |
| 2,668,236 | McCoy | Feb. 2, 1954 |
| 2,689,299 | Anderson | Sept. 14, 1954 |